(12) United States Patent
Bullis

(10) Patent No.: US 7,603,444 B2
(45) Date of Patent: Oct. 13, 2009

(54) USING DESCRIPTION FILES TO CONFIGURE COMPONENTS IN A DISTRIBUTED SYSTEM

(76) Inventor: George Anthony Bullis, 147 Branch Oak Ct., Glendora, CA (US) 91741

(*) Notice: Subject to any disclaimer, the term of this patent is extended or adjusted under 35 U.S.C. 154(b) by 852 days.

(21) Appl. No.: 10/980,004

(22) Filed: Nov. 3, 2004

(65) Prior Publication Data

US 2005/0114083 A1    May 26, 2005

Related U.S. Application Data

(60) Provisional application No. 60/518,026, filed on Nov. 7, 2003, provisional application No. 60/518,093, filed on Nov. 7, 2003.

(51) Int. Cl.
G06F 15/177    (2006.01)
(52) U.S. Cl. .................. 709/220; 709/223; 714/4
(58) Field of Classification Search ......... 709/220–224; 714/4
See application file for complete search history.

(56) References Cited

U.S. PATENT DOCUMENTS

| | | | |
|---|---|---|---|
| 5,619,702 A | 4/1997 | Ilic | |
| 6,539,520 B1 | 3/2003 | Tiong et al. | |
| 6,654,914 B1 | 11/2003 | Kaffine et al. | |
| 6,862,563 B1 | 3/2005 | Hakewill et al. | |
| 7,069,526 B2 | 6/2006 | Schubert et al. | |
| 7,152,123 B2 | 12/2006 | Meyer et al. | |
| 2003/0041098 A1* | 2/2003 | Lortz | 709/203 |
| 2003/0126260 A1* | 7/2003 | Husain et al. | 709/225 |
| 2003/0159124 A1 | 8/2003 | Fisher | |
| 2004/0006546 A1* | 1/2004 | Wedlake et al. | 709/224 |
| 2004/0098458 A1* | 5/2004 | Husain et al. | 709/204 |
| 2004/0255191 A1* | 12/2004 | Fox et al. | 714/25 |
| 2005/0050189 A1* | 3/2005 | Yang | 709/223 |

OTHER PUBLICATIONS

Non-Final Office Action for U.S. Appl. No. 10/974,291, Sep. 3, 2008.

* cited by examiner

Primary Examiner—Phuoc Nguyen
(74) Attorney, Agent, or Firm—Workman Nydegger

(57) ABSTRACT

The present invention provides for using description files to configure components in a distribute system. Computer-readable media store data structures representing a component mapping and a component description. Computer systems can utilize the data structures to access components in a diagnostic chassis. In some embodiments, a computer system receives application instructions for accessing a component. The computer system refers to the component mapping to identify components that are to be configured to implement the received application instructions. The computer system generates mapped application instructions in accordance with the referred to component mapping. The computer system refers to the component description to identify compatible low-level instructions for configuring the identified components. The computer system sends the compatible low-level instructions to the identified components to configure the identified components to implement the received application instructions.

33 Claims, 8 Drawing Sheets

USING DESCRIPTION FILES TO CONFIGURE COMPONENTS IN A DISTRIBUTED SYSTEM

CROSS-REFERENCE TO RELATED APPLICATIONS

The present application claims priority to U.S. Provisional Patent Application Ser. No. 60/518,026, entitled "Firmware Description Language For Accessing Firmware Registers", filed Nov. 7, 2003, which is hereby incorporated by reference in its entirety. The present application claims priority to U.S. Provisional Patent Application Ser. No. 60/518,093, entitled "Using Description Files To Configure Components In A Distributed System", filed Nov. 7, 2003, which is hereby incorporated by reference in its entirety.

BACKGROUND OF THE INVENTION

1. The Field of the Invention

The present invention relates generally to data transmission systems and components. More particularly, embodiments of the present invention relate to using description files to configure components in a distributed system.

2. The Relevant Technology

Nearly all computing devices include a processor and one or more other components, including registers. These components can be configured in various different ways to cause the computer device to operate in a specified manner. Registers are used to store configuration data (e.g., for configuring other components) that is to be or has been processed by the processor. For example, when a modem is to be configured for operation at 56 Kbps, a register value in the modem can be altered to indicate that configuration setting.

In many computing environments, direct access to components is not needed. For example, in a home or office computing environments, most users have no knowledge (and probably do not care) how computing device components operate. In these computing environments, system software (e.g., an operating system, compiler generated instructions, etc.) automatically controls component access and configuration Automated component access allows users to operate most, if not all, applications (e.g., word processing, electronic mail, communication programs, etc) without having detailed knowledge of the components in a corresponding computing device.

Even programmers that program in high-level languages (e.g., C++, C#, Visual Basic) do not necessarily have to have detailed knowledge of component operation. For example, a programmer could write source code that changes modem settings (through Application Program Interfaces) without having to include instructions that expressly reference any components. During compilation of the source code into computer-executable instructions (e.g., machine code), the compiler would include additional computer-executable instructions for appropriately accessing components.

However, in some environments, more direct component control is beneficial. For example, in network testing environments, network testing devices may need to be precisely configured for operation in many different (and sometimes adverse) network conditions. Configuring network testing devices can include modifying configuration options, based on current testing needs, to cause various components in the testing device to operate in a specified manner. Thus, a technician or administrator can change configuration options to configure a network testing device. Since changes to network testing device components may occur quite frequently, network testing devices often include software for interfacing directly with network testing device components.

Development of component access software for interfacing directly with network testing device components typically includes a system programmer developing a series of functions for accessing the components. For example, a network testing device may be configured with a clock, a control module, a memory module, etc. Accordingly, the system programmer can develop customized component access functions that directly access the clock, the control module, the memory module, etc, for purposes of configuring the network testing device. Internal to the component access functions would be hard-coded values representing component addresses.

Component access software can also include a number of other customized functions for changing other network testing device options (e.g., protocol, transmission speed, buffer sizes, etc). Accordingly, internal to each of these other customized functions would also be a hard-coded value representing the component addresses. Thus, as the number of configuration options increase, so does the number of customized functions included in a network testing device's component access software. A coding error in any one customized function can cause a network test to fail or otherwise operate improperly (e.g., capture incorrect network traffic, store captured data in an incorrect buffer, etc). Since a customized function is typically utilized for each configuration option, network testing devices with increased numbers of configuration options have a corresponding increased chance of operating improperly during a test.

Therefore systems, methods, computer program products, and data structures for using description files to configure components in a distributed system would be advantageous.

BRIEF SUMMARY OF THE INVENTION

The foregoing problems with the prior state of the art are overcome by the principles of the present invention, which are directed towards methods, systems, computer program products, and data structures for using description files to configure components in a distributed system. Computer-readable media store data structures representing a component mapping and a component description. Computer systems can utilize the data structures to access components in a diagnostic chassis. In some embodiments, a computer system receives application instructions for accessing a component. The computer system refers to the component mapping to identify components that are to be configured to implement the received application instructions. The computer system generates mapped application instructions in accordance with the referred to component mapping. The computer system refers to the component description to identify compatible low-level instructions for configuring the identified components. The computer system sends the compatible low-level instructions to the identified components to configure the identified components to implement the received application instructions.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
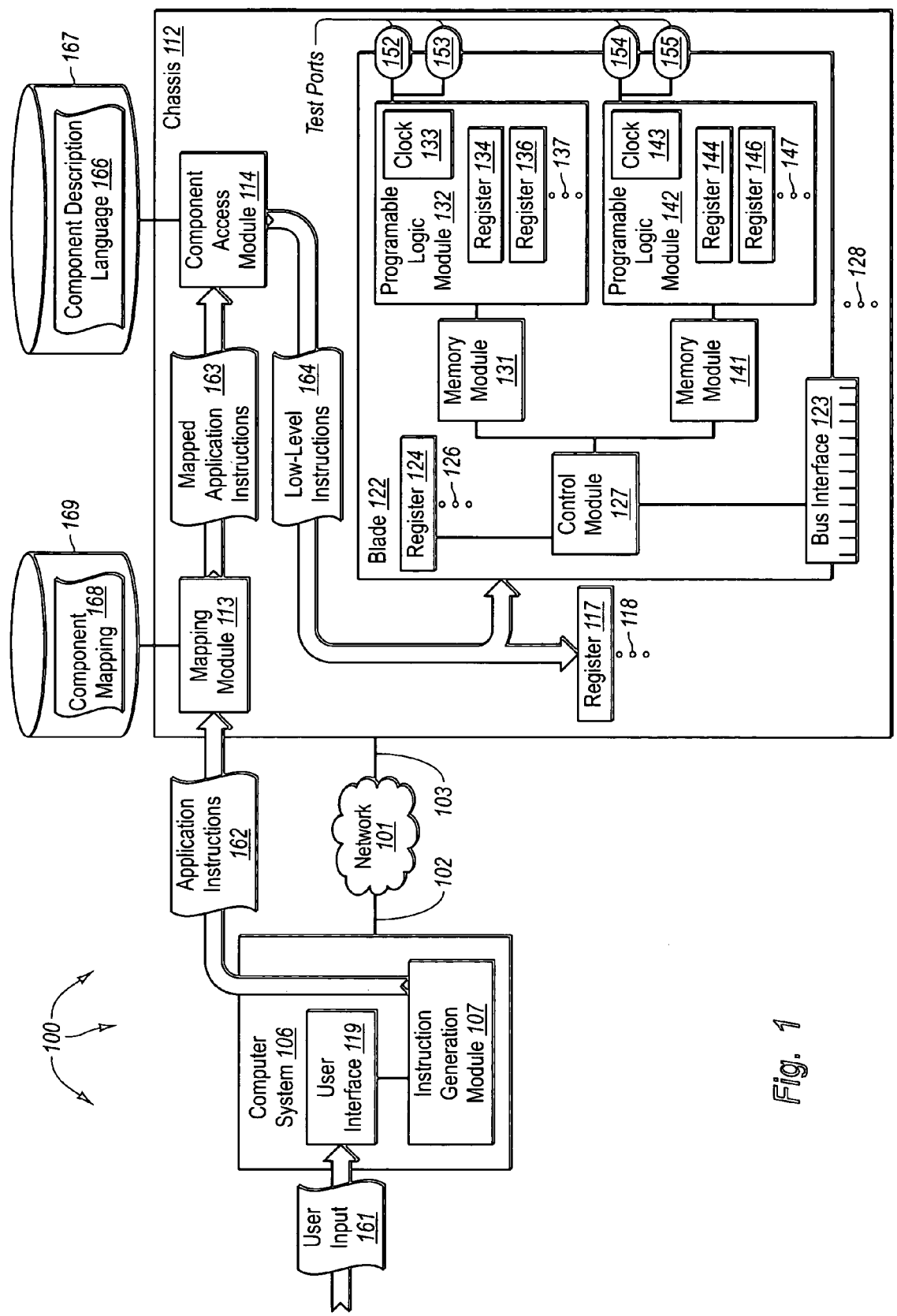
FIG. 1 illustrates an example of chassis architecture and associated modules and data structures for using description files to configure components in a distributed system.

The principles of the present invention provide for a firmware description language for accessing firmware registers. Computer-readable media store data structures representing a component mapping and a component description. Computer systems can utilize the data structures to access components in a diagnostic chassis. In some embodiments, a computer system receives application instructions for accessing a component. The computer system refers to the component mapping to identify components that are to be configured to implement the received application instructions. The computer system generates mapped application instructions in accordance with the referred to component mapping. The computer system refers to the component description to identify compatible low-level instructions for configuring the identified components. The computer system sends the compatible low-level instructions to the identified components to configure the identified components to implement the received application instructions.

A diagnostic chassis contains one or more configurable network diagnostic modules (e.g., blades). Each network diagnostic module includes one or more components, including programmable logic modules (e.g., one or more Field Programmable Gate Arrays ("FPGAs")) that include circuitry for implementing any of a plurality of different network diagnostic functions (e.g., network analyzer, jammer, generator, bit rate error test, etc). Each programmable logic module controls one or more test ports that provide interfaces for different physical configurations (e.g., Gigabit Ethernet, Fiber Distributed Data Interface, Fiber Channel, etc.) and that can interoperate with the programmable logic module to implement a selected network diagnostic function. In some embodiments, a network diagnostic module is included in a printed circuit board (hereinafter referred to as a "card" or "blade") that is inserted into an appropriate receptacle at a chassis (e.g., using a Peripheral Component Interconnect ("PCI") interface). Accordingly, the network diagnostic module may exchange data through electrical contacts of the receptacle.

Generally, a network diagnostic module receives a bit file with instructions for implementing a selected diagnostic function at one or more components, including test ports, that interface with a network. A bit file can be received from a mass storage device or even from a memory location at the network diagnostic module. Instructions can include computer-executable or computer-interpretable code that is processed by the network diagnostic module to implement the selected network diagnostic function.

The network diagnostic module identifies components, including a programmable logic module (e.g., an FPGA) that controls the one or more test ports. The network diagnostic module loads the included instructions at the identified programmable logic module to cause the programmable logic module and the identified components to interoperate to implement the selected diagnostic function. Accordingly, instructions contained in a bit file can be loaded at an FPGA to cause the FPGA and other components to implement any of a network analyzer, jammer, bit error rate tester, generator, etc. When a new implementation is desired (e.g., changing from a jammer to a bit error rate tester) instructions from a new bit file can be loaded.

It may be that a network diagnostic function is part of a "port personality" represented in a bit file. For example, a port personality can include a network diagnostic function, a speed (e.g., 1.065, 2.5, or 10.3125 Gigabits per second), and a protocol (e.g., Fiber Channel, Gigabit Ethernet, Infiniband, etc). Thus, a programmable logic module can process computer-executable or computer-interpretable instructions to cause a programmable logic module and a corresponding test port or test ports to interoperate to implement a port personality in accordance with the processed computer-executable or computer-interpretable instructions. For example, a programmable logic module can process instructions from a bit file to cause the programmable logic module and corresponding test ports to interoperate to implement a Fibre Channel jammer at 2.125 Gb/s. Accordingly, the personality of the corresponding test ports can include implementation of a particular network diagnostic function.

In some embodiments, a number of network diagnostic modules are included in a common chassis computer system. Thus, chassis computer systems with increased numbers of flexibly configurable test ports can be utilized to test a network. A common chassis computer system can include a mass storage interface for transferring network diagnostic data to and/or from a mass storage device, a trigger port for detecting the occurrence of events, an interconnect port for connecting to other chasses, and a remote access port for receiving commands from remote computer systems. Connected chasses can exchange control signals over links between corresponding interconnect ports. Accordingly, network diagnostic modules at a number of different chasses can be controlled from any of the other chasses. Connecting a number of chasses together can further increase the number test ports utilized to test a network.

FIG. 1 illustrates an example of network architecture 100 and associated modules and data structures for using description files to configure components in a distributed system. FIG. 1 depicts computer system 104 and chassis 112, which are connected to network 101 by corresponding links 102 and 103 respectively. Network 103 can be a Local Area Network ("LAN"), Wide Area Network ("WAN") or even the Internet. Computer system 104 and chassis 112 can utilize network 101 to compatibility transfer electronic messages in accordance with any number of different protocols, such as, for example, Internet Protocol ("IP") and other protocols (e.g., Transmission Control Protocol ("TCP"), Simple Mail Transfer Protocol ("SMTP"), and HyperText Transfer Protocol ("HTTP")) that utilize IP.

Computer system 104 includes user-interface 106 (e.g., a Web-based interface). Generally, user-Interface 106 can receive user-input and can present information associated with chasses. Some received user-input can cause instruction generation module 107 to generate application instructions representing configuration settings that are to be implemented at a chassis.

Chassis 112 (which may be a chassis computer system) includes mapping module 113, component access module 114, and blade 122. Chassis 112 is expressly depicted as including a single blade (blade 122). However, vertical ellipsis 128 (a sequence of three vertical periods) represents that chassis 112 can include one or more additional blades. Each blade at chassis 112 can include one or more components, including programmable logic modules, that are currently interoperating with one or more test ports to implement network diagnostic functions.

Blade 122 includes bus interface 123, control module 127, register 124 (vertical ellipsis 126 indicates additional registers can be included), memory modules 131 and 141, programmable logic modules 132 and 142, and ports 152, 153, 154, and 155. Programmable logic module 132 includes clock 133 and registers 134 and 136 (vertical ellipsis 137 indicates additional registers can be included). Similarly, programmable logic module 142 includes clock 143 and registers 144 and 146 (vertical ellipsis 147 indicates additional registers can be included). Components in blade 122 can be configured to implement various diagnostic functions. For example, control module 127, memory module 131, programmable logic module 132, registers 134 and 136, clock 133, and ports 152 and 153 can be configured to interoperate to implement a Fibre Channel jammer.

Mapping module 113 can receive application instructions representing component configuration settings that are to be implemented at a chassis 112. Mapping module 113 can refer to a component mapping (internal or external to chassis 112) to identify components that are to be manipulated to implement the received application instructions. Mapping module 113 can generate mapped application instructions that include references to the identified components. Mapping module 113 can send mapped application instructions to a component access module.

Component access module 114 can receive mapped application instructions. Component access module 114 can refer to a component description language (Internal or external to chassis 112) to identify compatible low-level instructions for accessing the identified components. Component access module 114 can generate or access low-level instructions (e.g., assembly or machine level instructions) for appropriately accessing the identified components. Component access module 114 can issue low-level instructions for configuring components to implement received application instructions. Sending low-level instructions can include sending low-level instructions to components in a chassis or blade. Low-level instructions can be, for example, computer-executable instructions or circuit design data.

In some embodiments, component mapping 168 is built into mapping module 113 and/or component description language 166 is built into component access module 114.

Vertical ellipsis 128 represents that chassis 112 can include one or more additional blades. Other blades included in chassis 112 can be different types of blades than blade 122. Each blade at chassis 112 can include one or more components that are currently interoperating to implement network diagnostic functions, such as, for example, BERTs, jammers, etc.

Figure 7:
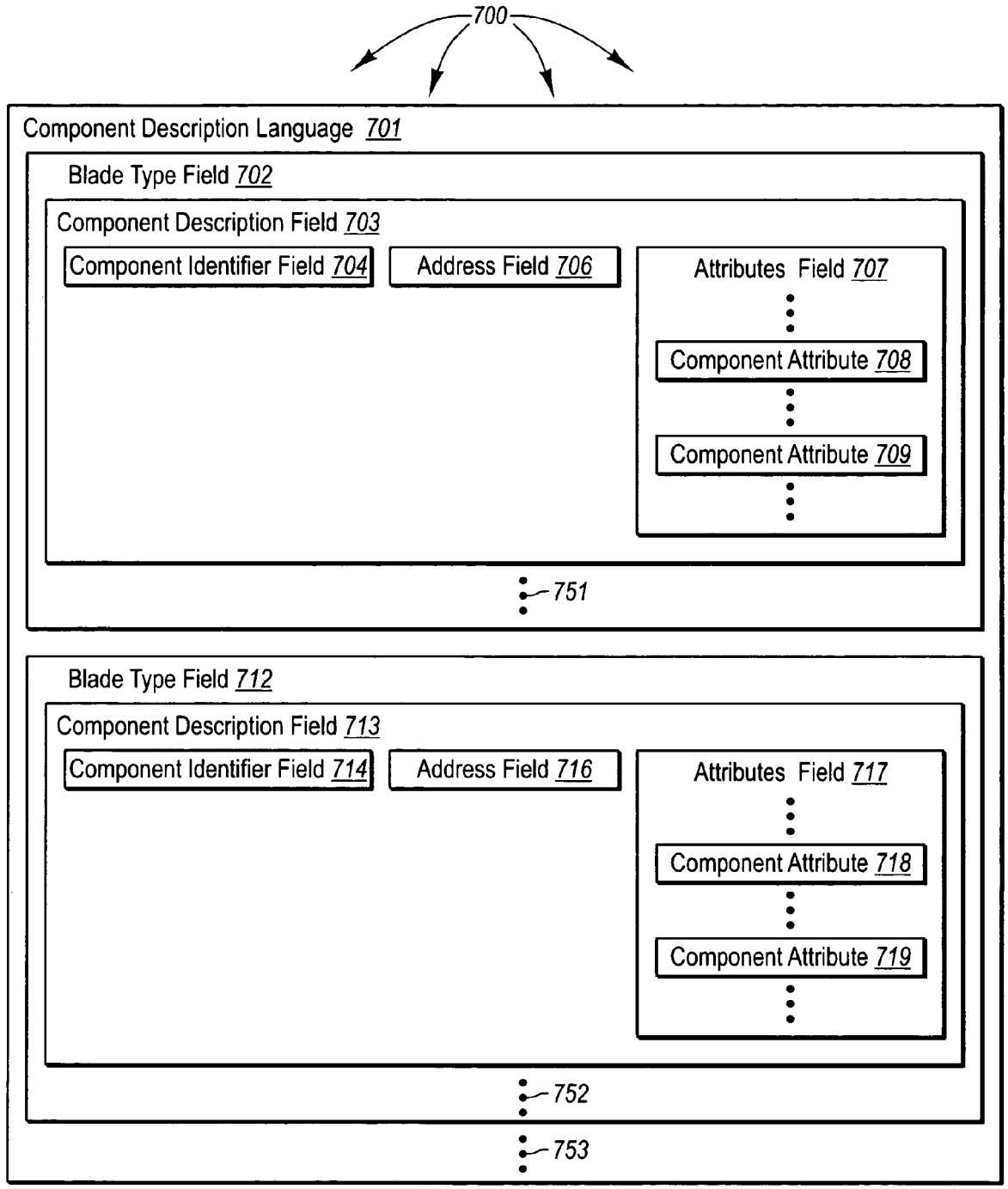
FIG. 7 illustrates an example data structure representing a component description language.

Component mapping 168 can constrain the meaning of received application instructions such that mapped application instructions can be generated. Likewise, component description language 166 can constrain the meaning of mapped application instructions such that compatible low-level instructions can be generated. It may be that component mapping 168 and component description language 166 are schemas that define data formats for application instructions. For example, component mapping 168 may be an Xtensible Markup Language ("XML") schema that defines the data formats for application instructions 162. Likewise, component description language 166 may be an XML schema that defines the data formats for mapped application instructions 163. FIG. 7 depicts a data structure 700 representing an example of a component description language 701.

Component description language 701 includes blade type fields 702 and 712. Each of the blade types fields can contain a value that represents a specific type of blade. For example, blade type field 702 can include a blade type value representing the blade type of blade 122 and blade type field 712 can include a value representing the blade type of a different blade in chassis 122 (or some other chassis). Vertical ellipsis 753 represents that component description language 701 can include additional blade type fields representing other blade types.

Blade type field 702 includes component description field 703. Component description field 703 can contain one or more component configuration values that describe a component included in the represented blade type represented (by the blade type value) in blade type field 702. For example, component description field 703 may describe programmable logic module 132. Component description field 703 includes register component field 704, address field 706, and attributes field 707. Component identifier field 704 can contain a component identifier value (e.g., a component name) that identifies the component described in component description field 703. A component identifier value can be included in received application instructions (e.g., application instructions 162). For example, component identifier field 704 can contain a register identifier value that identifies programmable logic module 132. Address field 706 can contain an address value that represents a hardware address of the component identified by the component identifier value contained in component identifier field 704. For example, address field 706 can contain an address value (e.g., an address offset value) that represents a hardware address for programmable logic module 132.

Attributes field 707 can contain one or more component attribute values representing component attributes for the component identified (by the component identifier value) in component identifier field 704. For example, attributes field 707 can contain one or more component attribute values representing component attributes for programmable logic module 132. Attributes field 707 further includes component attributes 708 and 709 (the depicted vertical ellipses represent that other attributes can be included before, between, or after the component attributes 708 and 709). Each component attribute (e.g., a name/value pair) can contain an attribute value corresponding to a specified component attribute. Component attributes can be utilized along with an address value to access a component identified in a component identifier field. For example, attribute values in component attributes 708 and 709 can be used along with an address value in address field 706 to access the component identified (by the component identifier value) in register identifier field 704.

As depicted by vertical ellipsis 751, blade type field 702 can include other component description fields (e.g., for memory module 131, clock 143, registers 134 136, and 146, etc) in addition to component description field 703.

Blade type field 712 includes component description field 713. Component description field 713 can contain one or more component configuration values that describe a component included in the blade type represented (by the blade type value) in blade type field 712. For example, component description field 713 may describe a component in another blade at 112 (or in some other chassis). Component description field 713 includes component identifier field 714, address field 716, and attributes field 717. The formats of and values stored in component description field 713, component identifier field 714, address field 716, and attributes field 717 can be similar to those previously described for description field 703, component identifier field 704, address field 706, and attributes field 707 respectively. The formats of and values stored in component attributes 218 and 219 be similar to those previously described for component attributes 208 and 209.

As depicted by vertical ellipsis 752, blade type field 752 can include other component description fields (e.g., for other components in blades of chassis 112 or some other chassis.

In some embodiments, attribute values can include a bit mask value, a bit value, a shift value, a max value (as well as other attributes, for example, as described in example A below). Attribute values can be used to identify portions of a register, such as, for example, the upper 8 bits of a 16 bit register. When more than one instance of a register is available, a register can also include an increment attribute. A plurality of related registers (a register complex) can be accessed with the same register name.

In other embodiments, attribute values can include appropriate values for configuring other components. Accordingly, the name value for a component can be converted to low-level instructions for accessing a component to configure the characteristics of the component.

Figure 2:
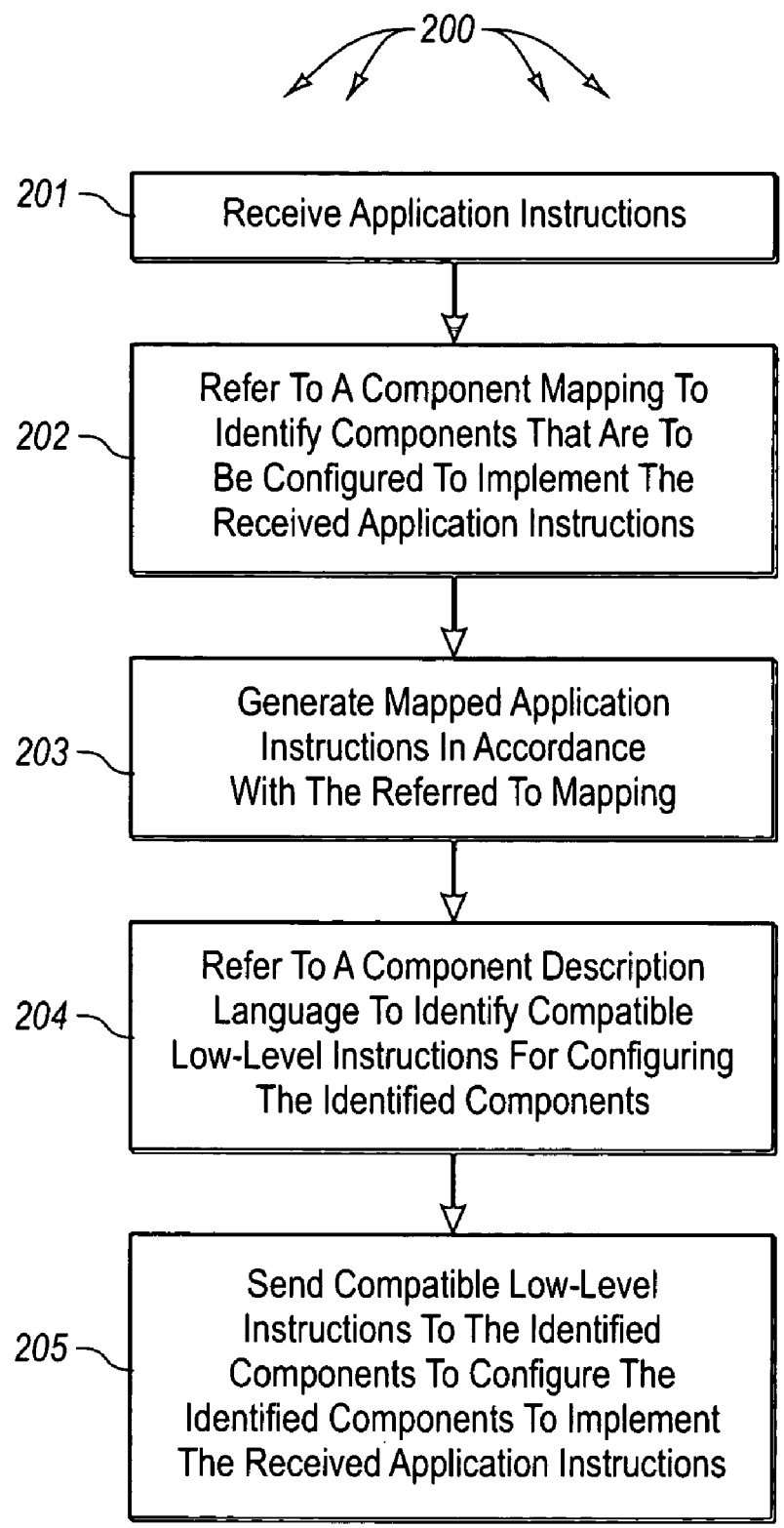
FIG. 2 illustrates a flowchart of a method for a using description files to configure components in a distributed system.

FIG. 2 illustrates a flowchart of a method 200 for using description files to configure components in a distributed system in accordance with the principles of the present invention. The method 200 will be discussed with respect to the modules and data structures depicted in network architecture 100. The method 200 includes an act of receiving application instructions (act 201). For example, chassis 112 can receive application instructions 162 from computer system 104.

The method 200 includes an act of referring to a component mapping to identify components that are to be configured to implement the received application instructions (act 202). For example, mapping module 113 can refer to component mapping 168 to identify components that are to be configured to implement application instructions 162. Component mapping 168 can be stored at mass storage device 169. Mass storage device 169 can be internal or external to chassis 112. In some embodiments, component mapping 168 is built into mapping module 113.

The method 200 includes an act of generating mapped application instructions in accordance with the referred to mapping (act 203). For example, mapping module 113 can generate mapped application instructions 163 in accordance with component mapping 168. Mapping module 113 can map a received application into one or more mapped application instructions corresponding to each component that is to be configured to implement the received application instruction. For example, mapping module 113 can map an application instruction of "speed=1.065 Gb/s" into various mapped application instructions for accessing each component (e.g., a control module, a mapping module, a programmable logic module, a clock, ports, registers, etc.) that is to be configured to facilitate changing the speed of a diagnostic operation to 1.065 Gb/s.

Depending on the type of blade, component mapping 168 can appropriately map received application instructions to different component names. Thus, computer system 104 can send similar (and potentially identical) application instructions to change components in any of a variety of different blade types.

The method 200 includes an act of referring to a component description language to identify compatible low-level instructions for configuring the identified components (act 204). For example, component access module 114 can refer to component description language 166 to identify (or generate) compatible low-level instructions for configuring components of blade 122. Component description language 166 can be stored at mass storage device 167. Mass storage device 167 can be internal or external to chassis 112. In some embodiments, component description language 166 is built into firmware access module 114.

Component access module 114 can identify (or generate) low-level instructions 164 that more concretely identify the components that are to be configured to implement the application instructions 162. For example, component access module 114 can cause a component name (e.g., for clock 143) to correspond to a hardware address (e.g., 0x0204 for clock 143). Depending on the type of blade, a component access module, can identify (or generate) different low-level instructions. For example, a clock may be accessed at hardware address 0x0200 for a first blade type, while a clock is accessed at hardware address 0x020A for a second blade type. Component access module 114 can identify the correct hardware address from component description language 166 based on the blade type. Thus, mapping module 113 can send similar (and potentially identical) mapped application instructions to component access module 114 to cause components at any of a variety of different blade types to be configured similarly, even if the components are accessed differently.

The method 200 includes an act of sending compatible low-level instructions to the identified components to configure the identified components to implement the received application instructions (act 205). For example, component access module 114 can send low-level instructions 164 (that implement application instructions 162) to one or more components of blade 122.

Low-level instructions 164 can include instructions that configure blade 122 to perform diagnostic functions. For example, low-level instructions 164 can include instructions for implementing an Infiniband BERT at test ports 154 and 155. Low-level instructions 164 can the configuration of components in blade 122 to implement the Infiniband.BERT. Alternately, low-level instructions 164 can include instructions that modify an existing configuration of blade 122. For example, low-level instructions may modify the speed of a Gigabit Ethernet Generator implemented at test port 154. Altering an existing configuration can include changing a component values, such as, for example, changing the value of register 144.

Some registers, such as, for example, register 117 can correspond to a chassis configuration. Other registers, such as, for example, register 124 can correspond to a blade setting. Yet other registers, such as, for example, registers 134, 136, 144, and 146 can correspond to a programmable logic module. Low-level instructions 164 can include instructions for changing the value of any of these registers. Vertical ellipses 118, 126, 137, and 147 represent that chassis 112, blade 122, programmable logic module 132, and programmable logic module 142 respectively can each include one or more registers in addition to those expressly depicted in network architecture 100. Low-level instructions 164 can include instructions for changing the value of any of these registers.

Figure 6A:
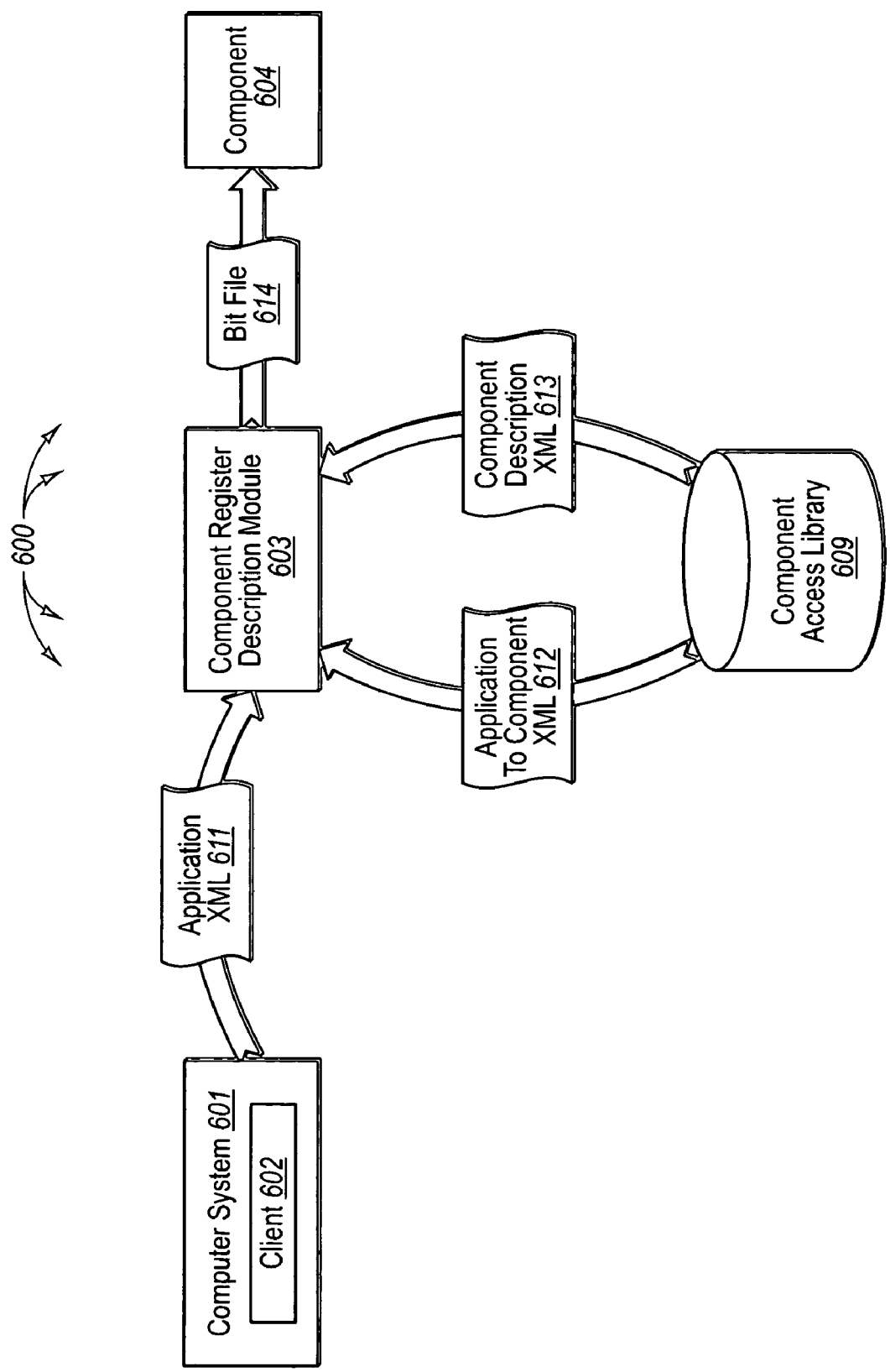
FIG. 6A illustrates an example architecture for configuring a component in a distributed system.

FIG. 6A illustrates an example architecture 600 for configuring a component in a distributed system. As depicted in architecture 600, computer system 601 includes client 602. Client 602 can be an application for generating application XML instructions, such as, for example, application XML 611. Component description module 603 can receive application XML, such as, for example, application XML 611. Firmware register description module 603 can access application to component XML 612 (to generate mapped application instructions from application XML 611) and firmware description XML 613 (to identify or generate compatible low-level instructions) from component access library 609. Application to component XML 612 and component description XML 613, can be description files (e.g., similar to description file 721) that were previously created by a computer system or program developer and included in component access library 609.

Component register description module 603 can map tags included in application XML 611 to appropriate values for configuring component 604, based on further instructions included in application to component XML 612 and component description XML 613 (e.g., collectively representing a component description language). Component description module 603 can generate bit file 614 (that included compatible low-level instructions) based on the mapped tags and send bit file 614 to component 604 (e.g., included in a blade). Component 604 can receive and process bit file 614 to become configured to implement application XML 611.

Component description module 603 (which may be viewed as a server) is configured to reduce the ongoing development and maintenance required to support a plurality of different (and potentially optional) diagnostic subsystems. Subsystems with similar functionality are abstracted, for example, with an identical interface, even if the functionality is implemented differently. Support of new functionality or even new subsystems can be reduced to a minimalist description rather than a new procedural and potentially lengthy and complex implementation.

Component description module 603 enables a developer to support a new distributed component, such as, for example, a blade, or new features on existing blades, with less lines of code and thus less possibility for error. Using component description module 603, new features can be added with as little as a one line description of a component to firmware description XML 612, and as little as one line to application to firmware XML 613. In some embodiments, no changes to executables are required, which reduces the testing burden. New distributed components can be supported by generating component specific description XML and application to firmware XML, which abstract out distributed component differences and present a common interface to client 602. By reducing the amount of code, new features can be added faster and with less opportunity for failure.

Figure 6B:
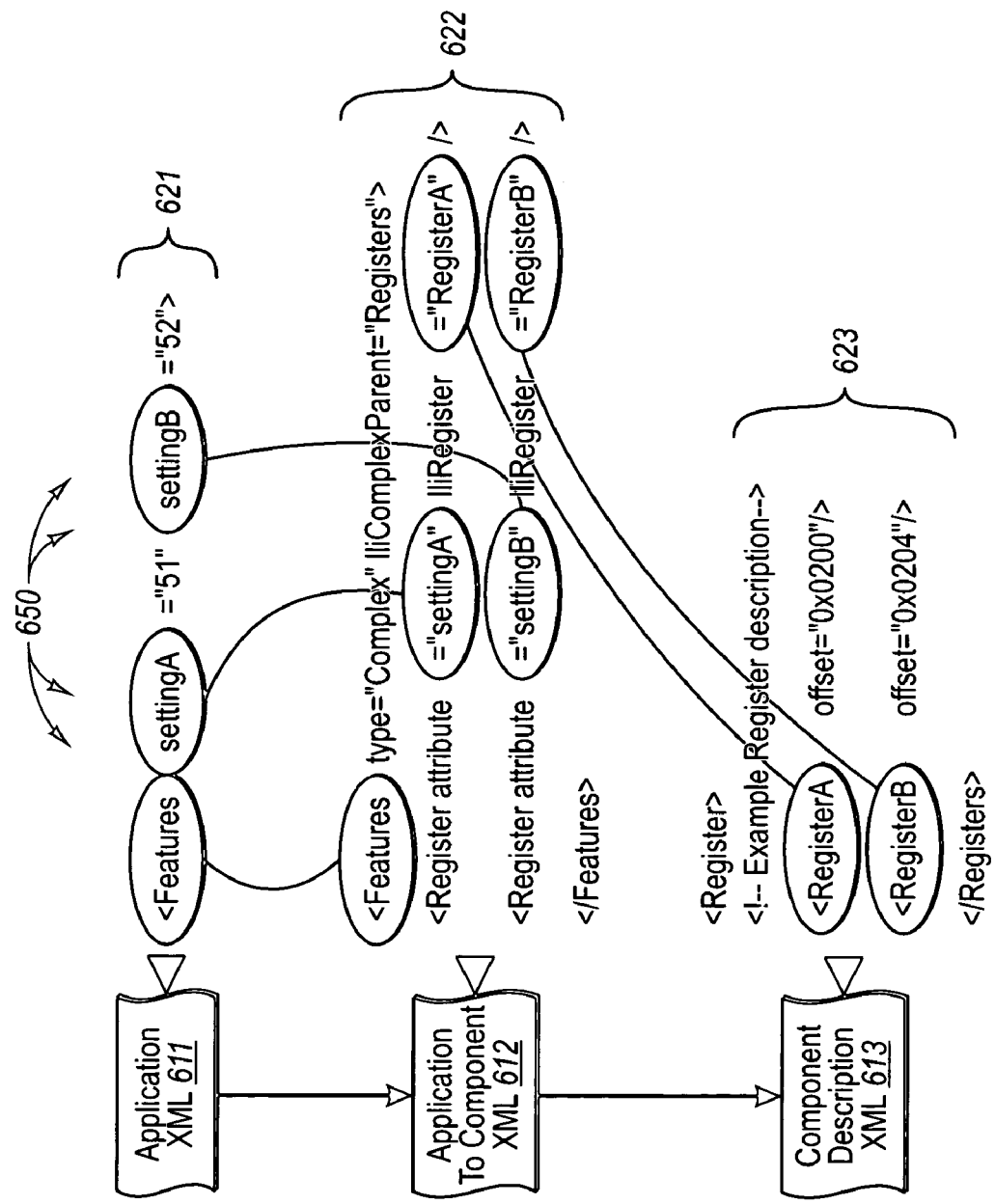
FIG. 6B illustrates an example flow chart for utilizing the components and data in FIG. 6A to configure a component in a distributed system.

FIG. 6B illustrates an example flow chart 650 for utilizing the components and data of architecture 600 to configure a component in a distributed system. Flow chart 650 will be described with respect to the components and data in architecture 600.

As previously described, component description module 603 can receive command, such as, for example, an XML string, from client 602. For example, component description module 603 can receive application XML 611 from client 602. As depicted in flow chart 650, application XML 611 can include computer-executable or computer-interpretable instructions 621 (one or more name/value pairs).

As previously described, component description module 603 can be configured to understand the high level structure application XML 611. Component description module 603 can locate the tags within XML instructions, which used to configure the distributed component a component mapping. For example, component description module 603 can locate the <Features> tag within instructions 621.

The <Features> tag is looked up in the application to component XML 612. If the <Features> tag is not found it can be ignored. However, in the example, flow chart 650, the <Features> tag is found in instructions 622. The <Features> tag in instructions 622 describes how to interpret the <Features> tag in instructions 621. For example, instructions 622 map "settingA" and "settingB" from instructions 621 to to "RegisterA" and "RegisterB" respectively. Values for "settingA" and "settingB" (i.e., 51 and 52) are rewritten as values for "RegisterA" and "RegisterB" respectively. <Features> tags for other types of components can also be used.

"RegisterA" and "RegisterB" are in turn looked up in component description XML 613. Instructions 623 map "RegisterA" and "RegisterB" to offsets "0x0200" and "0x0204" respectively. These offset attributes for "RegisterA" and "RegisterB" describe the physical address that the values (i.e., 51 and 52) specified in instructions 612 are to be written to. Offsets for other types of components can also be used.

The end result can be a call to distributed component routine, such as, for example:

distributed component->portWrite(addr, value); with addr set to 0x0200 and value set to 51; and distributed component->portWrite(addr, value); with addr set to 0x0204 and value set to 52.

In the example, flow chart 650, the Feature, RegisterA, and RegisterB tokens were application specific and may not be included in component description module 603 source code. Other tokens, such as, for example, memory_start, memory_stop, SpeedReg, ModeReg, MemStartReg, MemStopReg, SpeedReg, ControlReg, ModeReg, DebugReg, XlateReg can also be application specific tokens. Application specific tokens can be soft tokens that are chosen by an author of corresponding XML instructions.

The following Examples A, B, and C are examples of description files that can be used in accordance with the principles of the present invention. Examples A, B, and C refer to registers. However, it would be apparent to one skilled in the art, after having reviewed this description, that similar examples can be generated for other types of components. Further, it should be understood that examples A, B, and C are merely examples of component description XML, application to component XML, and application XML respectively and that other examples can be used in combination with these or other XML instructions.

Tokens in Example A that can be located in an engine (e.g., in component description module 703) include: type, lliComplexParent, Register, attribute, lliRegister, offset. These constitute part of a component description language.

EXAMPLE A

Sample Component Description XML

<!- - - Registers section. This section contains definitions for registers (or bit fields in registers) that have a single instance—and that stand alone, i.e. are not part of a group. - - - ><!-

Registers

The child elements of the Registers element (registers) are named after the registers listed in the firmware documentation. Each child element of Registers must have a unique name.

The required attributes of the register elements depend on the kind of register being described.

type="int32"—

The int32 type register is assumed. The only required attribute is offset, which is the address that would be passed to a CPort object to access the register.

type="BIT"—

The BIT type has two required attributes (beyond the type="BIT" attribute). reg="registerelement" is the name of a int32 type register which holds this BIT register. bitvalue="0x000" is the value to be or'd in to set this bit_register, or nand'd out to clear the bit_register. Note that it is legal to specify more than one bit in the bitvalue.

type="Field"—

The Field type is used to describe multi-bit fields in int32 registers. Like the BIT type, there is a required reg="int32Registerelement" attribute. There are two more attributes which are required; shift="numbitsToShift" and a max="maxvalueofField". Note that the max is used to clear out the field before the new value is or'd in, so the value of the max attribute should be an integer max=2**n−1, where n is the width of the bitfield.

type="Match"

The Match type describes Match registers. MatchMask strings are in the form "01XX" where the "XX"'s are don't cares, and all the other digits are to be matched. So when converting these match strings to firmware match values, the X's are set to 0. The Match type registers have an additional optional attribute byteLen="4", which defaults to 4, and is currently always 4 or 32.

type="Mask"

The Mask type describe Mask registers. MatchMask strings are in the form "01XX" where the "XX"'s are don't cares, and all the other digits are to be matched. So when converting these matchMask strings to firmware mask values, the X's are set to 0, and all the other digits are set to F's. The Mask type registers have an additional optional attribute byteLen="4", which defaults to 4, and is currently always 4 or 32.

Optional Register Attributes
    increment="0x2000"

The presence of the optional increment flag indicates that more than one instance of the register is available in the firmware. Access to successive elements is performed by multiplying the increment by the instance count and adding the result to the reg attribute value. Increment units can be in bytes.

Complexes

Complexes describe a collection of registers that are a related group. Because the subfunctions of the groups of registers are often repeated, the names of registers in a complex are not required to be globally unique. However, they may be unique within the complex in which they are found.

When registers of type BIT and Field, are found in a complex group, the reg attribute can refer to a register which is in the same complex.

Other Types of Register types include:

```
PortDependantBIT, csr_int32, MatchMask SingleByte
-->
<Registers>
<!-- Example Register descriptions -->
    <RegisterA offset="0x0200"/>
    <RegisterB offset="0x0204"/>
    <otherregisterC offset="0x0208"/>
    <otherregisterD offset="0x020C"/>
<!-- End of Example Register descriptions -->
    <aControlBit       type="BIT" reg="RegisterA" bitvalue="0x4000"/>
    <anotherControlBit type="BIT" reg="RegisterA" bitvalue="0x2000"/
    <controlState     type="Field" reg="RegisterB" shift="0" max = "7"/>
</Registers>
```

EXAMPLE B

Sample Application to Component XML

```
<!--
App2Firmware.XML contains information to help map AppClient XML messages to
FRD.XML described hardware settings.
-->
<!-- TYPE LIST _____
default type - write value as int32 to register
default bitType - write (value=="True") to bit value
constant - look up value under <Constants> element to write to register BitNegateRegister - write opposite of setting to specified register
BitMatch Value - write truth value of (setting== matchValue) to specified register
MB2B_AddTCLLIConstant - convert from MB's to Bytes and add to specificed TC_LLI
constant and write to specified register
-->
<!-- ------------ Example Section - Features --------- -->
<Features type="Complex" lliComplexParent="Registers" >
    <Register lliRegister="RegisterA" attribute="speed" />
```

-continued

```
    <Register lliRegister="RegisterB" attribute="mode" />
    <Register lliRegister="otherregisterC" attribute="settingC" />
    <Register lliRegister="otherregisterD" attribute="settingD" />
</Features>
<!-- End of example -->
</App2Firmware >
```

EXAMPLE C

Sample Application XML

```
<APP_XML version="0.1" date="19/06/03" time="13:38:50" type="DomainCommand">
    <Configure>
        <PortConfigure ipAddress="10.32.0.74" bladeNumber="1" portNumber="0" >
            <Features speed ="51" mode = "0" />
        </PortConfigure>
    </Configure>
</APP_XML>
```

As previously described, mapping module 113 can receive application instructions 162. Mapping module 113 can refer to a component mapping (e.g., as represented in Example B above) to identify components that are to be manipulated and can generated mapped application instructions for the identified components. Component access module can refer to a component description (e.g., as represented in Example C above) to identify or generated appropriate low-level instructions for configuring the components.

Figure 3:
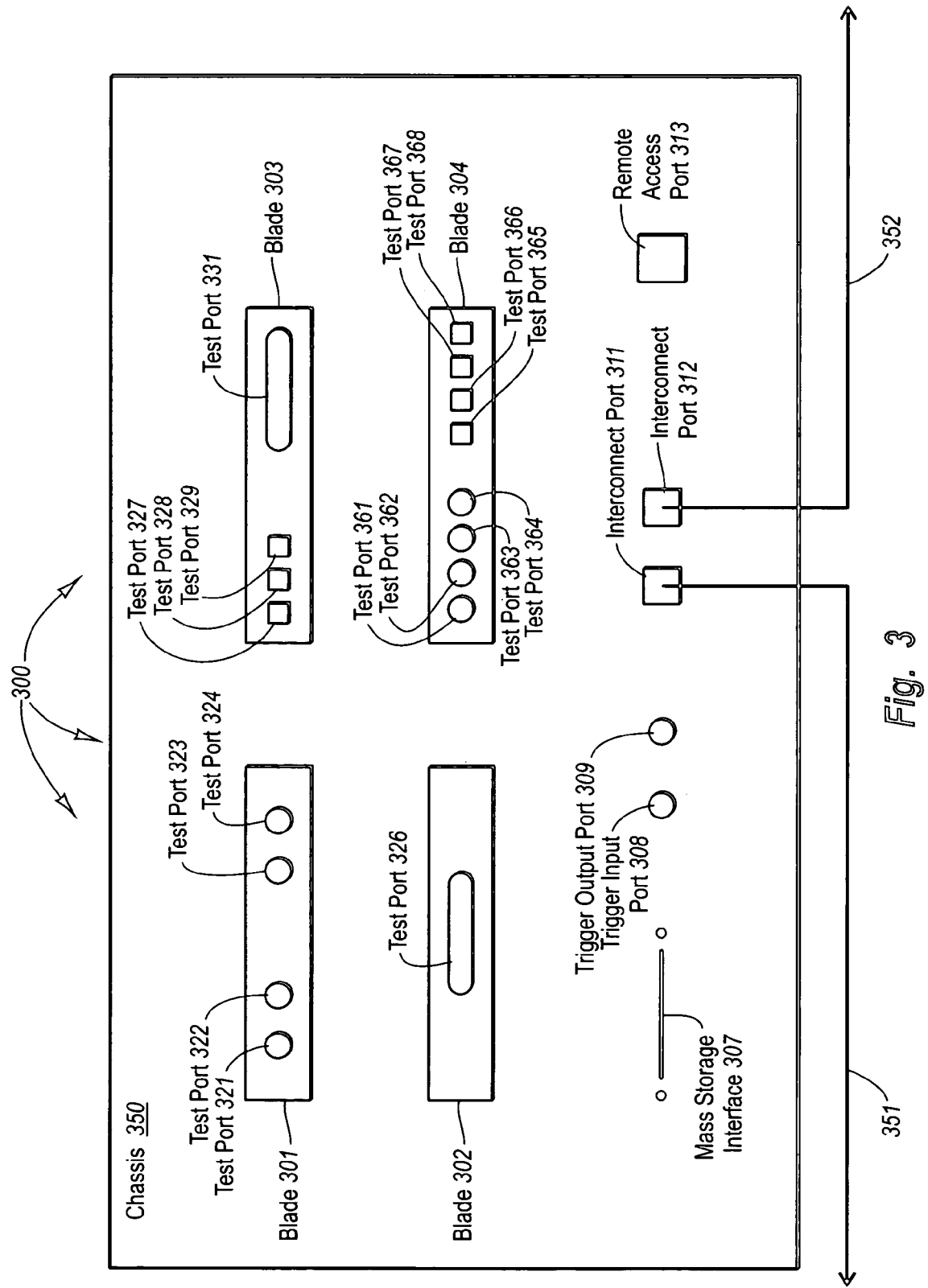
FIG. 3 illustrates an example chassis computer system architecture including a plurality of network diagnostic modules.

FIG. 3 illustrates an example computer system architecture 300 including a plurality of network diagnostic modules in accordance with the principles of the present invention. Depicted in computer system architecture 300 is chassis 350, which includes blades 301, 302, 303, and 304. Although not expressly depicted, each of blades 301, 302, 303, and 304 are coupled, through an appropriate bus interface, to a computer system bus of chassis 350. For example, each of blades 301, 302, 303, and 304 can include PCI bus interfaces that are inserted into PCI receptacles at chassis 350. Accordingly, computer-executable or computer-interpretable instructions can be transferred over the computer system bus to blades 301, 302, 303, and 304 to configure and re-configure corresponding test ports.

Blades coupled to a chassis can have different numbers and configurations of test ports. For example, depicted at blade 301 test ports 321, 322, 323 and 324 can each be SFP ports. Depicted at blade 303 test ports 327, 328 and 329 can be RJ-45 ports and test port 331 can be a 300-pin MSA port. Depicted at blade 302 test port 326 can be a 300-pin MSA port. Depicted at blade 304 test ports 361, 362, 363, and 364 can be SFP ports and test ports 365, 366, 367, and 368 can be RJ-45 ports. Accordingly, the test ports of chassis 350 can be simultaneously connected to the same or a variety of different networks, such as, for example, 10 Gigabit Ethernet, 100 Megabit Ethernet, Infiniband, and SONET networks, to implement the same or a variety of different network diagnostic functions.

Mass storage interface 307 can be an interface for coupling to mass storage devices. Accordingly, as network diagnostic data, for example, results of network diagnostic functions, is collected at blades 301, 302, 303, and 304, the network diagnostic data can be transferred to the mass storage device for storage. Statistics and logs resulting from network diagnostic functions can be stored at a coupled mass storage device.

Mass storage interface 307 may be a Small Computer System Interface ("SCSI") that is coupled to a SCSI hard drive.

Interconnect ports 311 and 312 (e.g., RJ-11 ports) can be utilized to connect chassis 350 to other chasses (not shown). Connections from chassis 350 to other chasses, for example, as illustrated by links 351 and 352, can be utilized to transfer control signals that coordinate the collection of network diagnostic data. For example, the collection of network diagnostic data for a network analyzer implemented in blade 304 can be coordinated with the collection of network diagnostic data for a bit error rate tester implemented at another chassis coupled to link 351. Accordingly, through the exchange of control signals, it may be that test ports at a plurality of different chasses are configured to implement network diagnostic functions in a coordinated manner.

Trigger input port 308 and trigger output port 309 (e.g., TTL ports) can be utilized to transfer trigger signals to and from chassis 350. Generally, trigger signals can indicate the occurrence of an event to a chassis. In response to the occurrence of an event, a chassis can activate or deactivate network diagnostic functionality. For example, it may be that a programmable logic module controlling test port 326 is implementing a bit error rate tester. However, it may be desirable to activate bit error rate testing of a network coupled to port 326 only when a particular computer system is transmitting data onto the network. An appropriate mechanism for detecting when the particular computer system is transmitting data can be utilized to generate a trigger signal.

When a trigger signal is received at trigger input port 308, bit error rate testing through port test 326 can be activated. When the trigger signal is not longer received at trigger input port 308, bit error rate testing through test port 326 can be deactivated. In some embodiments, for example, when a plurality of chassis are connected, trigger inputs and outputs of different chassis can be coupled together so that the chassis receive the same triggers. For example, trigger input port 308 can be coupled to a trigger output port of a chassis connected to link 351 and/or trigger output port 309 can be coupled to a trigger input port of a chassis connected to link 352. Accordingly, when test ports at a plurality of different chassis are configured to perform coordinated network diagnostic functions, the network diagnostic functions can be activated and deactivated in response to the same events.

Remote access port 313 (e.g., an RJ-45 port) can be utilized to remotely configure chassis 350. Through remote access port 313, chassis 350 can be coupled to a network, such as, for example, a Local Area Network ("LAN") or Wide Area Network ("WAN"), along with one or more other computer systems (e.g., a computer system that sent application instructions 104). The other computer systems can utilize the network to access configuration information from chassis 350. The other computer systems can also initiate configuration requests to configure or re-configure ports included in chassis 350 and can request results of network diagnostic functions. Accordingly, an administrator or user at a remote computer system can configure the test ports of chassis 350 (as well as configuring test ports at other chasses connected to the network) to implement selected network, diagnostic functions and can request collected results.

In some embodiments, a hardware description language defines similar (or the same) low-level instructions for accessing registers of similar types (or of the same type). Using similar definitions for similar registers reduces the coding burden and thus corresponding reduces the chance for error.

Figure 4:
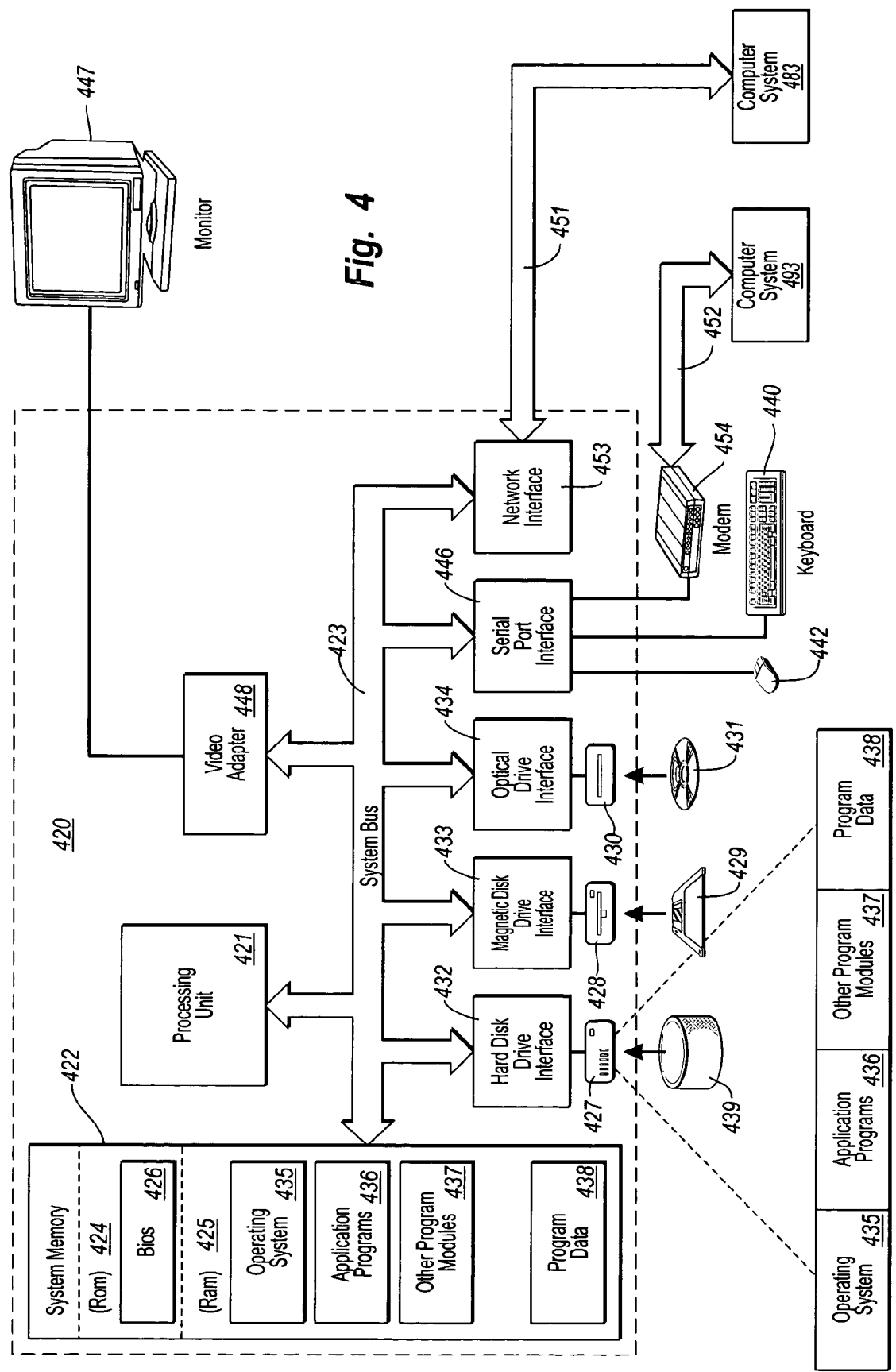
FIG. 4 illustrates a suitable operating environment for the principles of the present invention.

FIG. 4 illustrates a suitable operating environment for the principles of the present invention. FIG. 4 and the following discussion are intended to provide a brief, general description of a suitable computing environment in which the invention may be implemented. With reference to FIG. 4, an example system for implementing the invention includes a general-purpose computing device in the form of computer system 420.

Computer system 420 includes a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a PCI bus, a peripheral bus, and a local bus using any of a variety of bus architectures. Computer system 420 can include one or more receptacles for receiving print circuit boards or "cards" that interface with system bus 423. System memory 422 includes read only memory ("ROM") 424 and random access memory ("RAM") 425. A basic input/output system ("BIOS") 426, containing the basic routines that help transfer information between elements within the computer 420, such as during start-up, may be stored in ROM 424.

The computer system 420 may also include a magnetic hard disk drive 427 (e.g., a SCSI drive) for reading from and writing to a magnetic hard disk 439, a magnetic disk drive 428 for reading from or writing to a removable magnetic disk 429, and an optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide nonvolatile storage of computer-executable instructions, data structures, program modules, and other data for computer system 420. Although the example environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437 (e.g., bit files), and program data 438. A user may enter commands and information into the computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Alternatively, input devices can be connected by other interfaces, such as, for example, a parallel port, a game port, a universal serial bus ("USB") port, or a Fire Wire port. A monitor 447 or other display device is also connected to system bus 423 via video adapter 448. Computer system 420 can also be connected to other peripheral output devices (not shown), such as, for example, speakers and printers.

Computer system 420 is connectable to networks, such as, for example, an office-wide or enterprise-wide computer network, an intranet, and/or the Internet. Computer system 420 can exchange data with external sources, such as, for example, remote computer systems, computer system chasses containing network diagnostic modules, remote applications, and/or remote databases over such a network.

Computer system 420 includes network interface 453, through which computer system 420 receives data from external sources and/or transmits data to external sources. As depicted in FIG. 4, network interface 453 facilitates the exchange of data with remote computer system 483 via link 451. Link 451 represents a portion of a network, and remote computer system 483 represents a node of the network.

Likewise, computer system 420 includes input/output interface 446, through which computer system 420 receives data from external sources and/or transmits data to external sources. Input/output interface 446 is coupled to modem 454, through which computer system 420 receives data from and/or transmits data to external sources. Alternately, modem 454 can be a Data Over Cable Service Interface Specification ("DOCSIS") modem or digital subscriber lines ("DSL") modem that is connected to, computer system 420 through an appropriate interface. However, as depicted in FIG. 4, input/output interface 446 and modem 454 facilitate the exchange of data with remote computer system 493 via link 452. Link 452 represents a portion of a network, and remote computer system 493 represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

Modules of the present invention, as well as associated data, can be stored and accessed from any of the computer-readable media associated with computer system 420. For example, portions of such modules and portions of associated program data may be included in operating system 435, application programs 436, program modules 437 and/or program data 438, for storage in system memory 422. When a mass storage device, such as, for example, magnetic hard disk 439, is coupled to computer system 420, such modules and associated program data may also be stored in the mass storage device. In a networked environment, program modules and associated data depicted relative to computer system 420, or portions thereof, can be stored in remote memory storage devices, such as, for example, system memory and/or mass storage devices associated with remote computer system 483 and/or remote computer system 493. Execution of such modules may be performed in a distributed manner.

Figure 5:
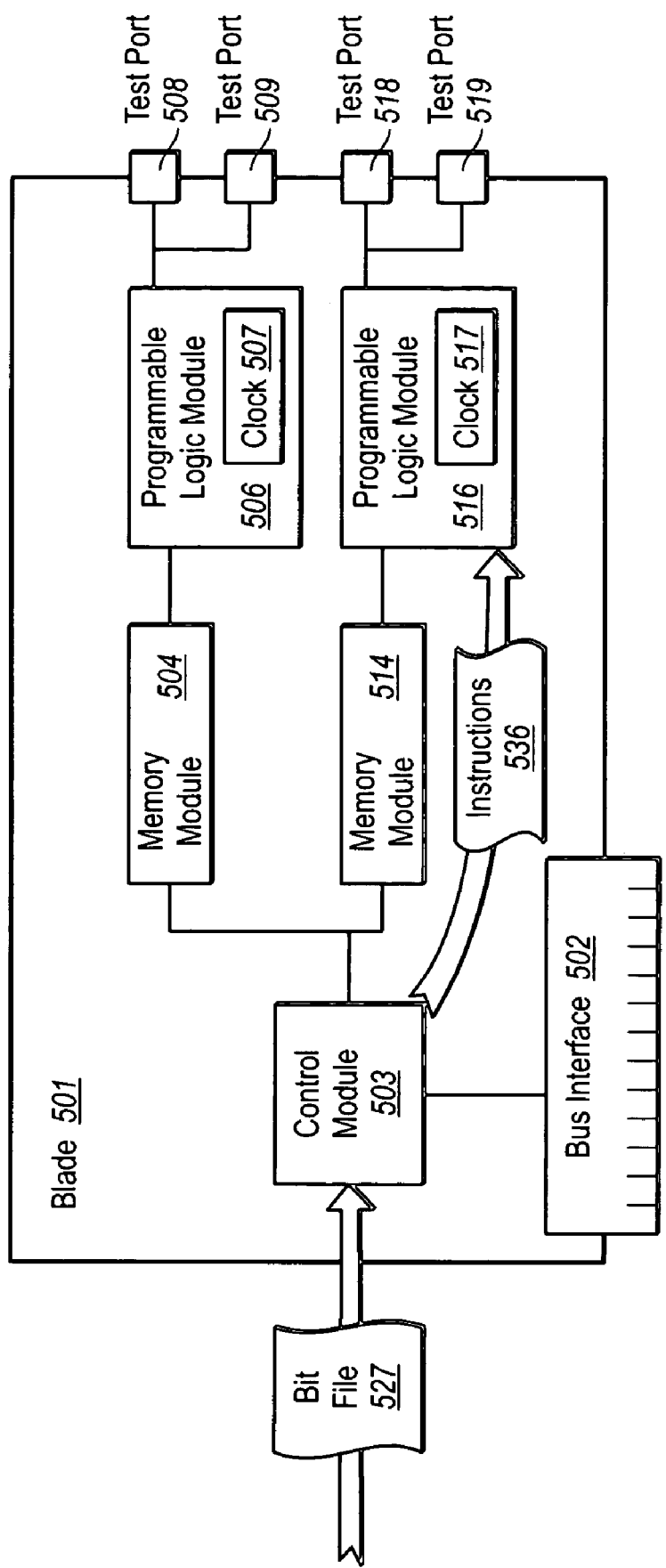
FIG. 5 illustrates an example of network diagnostic components that can interoperate to implement a network diagnostic function.

FIG. 5 illustrates an example of a network diagnostic module and test ports that can interoperate to implement a network diagnostic function. The network diagnostic module and test ports are implemented in blade 501, which can be a printed circuit board. Bus interface 502 can be inserted into an appropriate receptacle (e.g., a Peripheral Component Interconnect ("PCI") interface) at a computer system to communicatively couple blade 501 to the computer system. Blade 501 can communicate (e.g., sending and receiving appropriate electrical signaling) with a corresponding computer system bus (e.g., a PCI bus) through bus interface 502.

Blade 501 includes memory 504 and programmable logic module 506 that control the functionality of test ports 508 and 509. Memory 504 can be any of a variety of different types of memory, such as, for example, Random Access Memory ("RAM"). Memory 504 can be used to store instructions for programmable logic module 506 and to buffer data that is transferred between programmable logic module 506 and control module 503. Programmable logic module 506 can be virtually any type of programmable circuit, such as, for example, a Field-Programmable Gate Array ("FPGA"), Programmable Logic Array ("PLA"), or other type programmable logic device. Programmable logic module 506 can include circuitry form implementing any of a plurality of network diagnostic functions (e.g., network analyzer, jammer, generator, or bit error rate tester, etc).

It may be that a network diagnostic function is part of a "port personality" represented in a bit file. For example, a port personality can include a network diagnostic function, a speed (e.g., 1.065, 2.5, or 10.3125 Gigabits per second), and a protocol (e.g., Fiber Channel, Gigabit Ethernet, Infiniband, etc). Accordingly, programmable logic module 106 can process computer-executable or computer-interpretable instructions to cause programmable logic module 506 and test port 508 and/or test port 509 to interoperate to implement a port personality in accordance with the processed computer-executable or computer-interpretable instructions. For example, programmable logic module 506 can process instructions from a bit file to cause programmable logic module 506 and test ports 508 and test port 509 to interoperate to implement a Fiber Channel jammer at 2.125 Gb/s. Accordingly, the personality of test port 508 and the personality of test port 509 can include implementation of a particular network diagnostic function.

It may that a plurality of test ports are utilized together to implement a particular network diagnostic function. For example, test ports 508 and 509 can be utilized together to implement a network analyzer. On the other hand, it may be a first test port is utilized to implement a first network diagnostic function, while a second different test port is simultaneously utilized to implement a second different network diagnostic function. For example, test port 508 can be utilized to implement a generator, while test port 509 is simultaneously utilized to implement a bit error rate tester. A bit file having appropriate instructions can be loaded at a programmable logic module 506 to cause test port 508 and test port 509 to simultaneously implement different network diagnostic functions. Clock 507 can coordinate the appropriate timing of data transferred to and from test port 508 and test port 509.

Blade 501 also includes memory 514 and programmable logic module 516 that control the functionality of test ports 518 and 519. Similar to memory 504, memory 514 can be any of a variety of different types of memory, such as, for example, Random Access Memory ("RAM"). Memory 514 can be used to store instructions for programmable logic module 516 and to buffer data that is transferred between programmable logic module 516 and control module 503. Similar to programmable logic module 506, programmable logic module 516 can be virtually, any type of programmable circuit, such as, for example, a Field-Programmable Gate Array ("FPGA"), Programmable Logic Array ("PLA"), or other type programmable logic device. Similar to programmable logic module 506, programmable logic module 516 can include circuitry form implementing any of a plurality of network diagnostic functions (e.g., network analyzer, jammer, generator, or bit error rate tester, etc). Although not required, it may be that programmable module 506 and programmable logic module 516 are the same type of programmable logic module.

Similar to programmable logic module 506, programmable logic module 516 can process computer-executable or computer-interpretable instructions (e.g., instructions 536) to cause programmable logic module 516 and test port 518 and/or test port 519 to interoperate to implement a port personality (including network diagnostic function, speed, and protocol) in accordance with the processed computer-executable or computer-interpretable instructions. Test ports 518 and 519 can be utilized together to implement a particular network diagnostic function. On the other hand, test port 518 may be utilized to implement a first network diagnostic function, while test port 519 is utilize to implement a second different network diagnostic function. For example, programmable logic module 516 can process instructions from a bit file (e.g., bit file 527) to cause programmable logic module 516 and test ports 518 to interoperate to implement a Fiber Channel bit error rate test at 10.51875 Gb/s and to cause programmable logic module 516 and test ports 519 to interoperate to implement a Infiniband generator at 1.065 Gb/s. A bit file having appropriate instructions can be loaded at programmable logic module 516 to cause test port 518 and test port 519 to simultaneously implement different network diagnostic functions. Clock 517 can coordinate the appropriate timing of data transferred to and from test port 518 and test port 519.

Test ports of different programmable logic modules can be configured to implement the same personalities. For example, programmable logic module 506 may process instructions that that cause test ports 508 and 509 to implement a Gigabit Ethernet analyzer at 1.065 GB/s, while programmable logic module 516 also processes instructions that cause test ports 518 and 519 to implement a Gigabit Ethernet analyzer at 1.065 GB/s. On the hand, test ports of different programmable logic modules can be configured to implement different personalities. For example, programmable logic module 506 may process instructions that that cause test ports 508 and 509 to implement a Fiber Channel analyzer at 2.125 GB/s, while programmable logic module 516 processes instructions that cause test ports 518 and 519 to implement an Infiniband analyzer at 10.51875 GB/s.

Test ports 508, 509, 518 and 519 can be of virtually any physical configuration, such as, for example, RJ-11, RJ-45, small form-factor pluggable ("SFP"), Universal Serial Bus ("USB"), IEEE 1394 (Firewire), 300-pin MSA, etc. Test ports 508, 509, 518 and 519 can also be physically configured to receive virtually any type of cabling, such as, for example, cabling that carries electrical signals or carries optical signals.

Although not required, it may be that ports controlled by the same programmable logic module are configured as the same type of port. For example, test ports 508 and 509 (both controlled by programmable logic module 506) may both be SFP ports configured to receive optical cable.

Control module 503 coordinates the transfer of data between bus interface 102 and memories 504 and 514. Control module 503 can translate data received from bus interface 502 (e.g., a PCI interface) into a format that can be processed by programmable logic modules included in blade 501. Likewise, control module 503 can translate data received from a programmable logic module into a format that can be compatibly transferred over a computer system bus (e.g., a PCI bus) that is communicatively coupled to bus interface 502. Based on received data (e.g., appropriate addressing information), control module 503 can also identify the programmable logic module that is associated with the received data. Accordingly, control module 503 can transfer at least a portion of the received data (e.g., computer-executable or computer-interpretable instructions) to the associated programmable logic module.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. In a chassis, a method for configuring components to implement a network diagnostic function, the method comprising:
   an act of receiving application instructions;
   an act of referring to a component mapping to identify components that are to be configured to implement the received application instructions;
   an act of generating mapped application instructions in accordance with the referred to component mapping;
   an act of referring to a component description language to identify corresponding compatible low-level instructions for configuring the identified components; and
   an act of sending compatible low-level instructions to the identified components to configure the identified components to implement the received application instructions.

2. The method as recited in claim 1, wherein the act of receiving application instructions comprises an act of receiving application instructions from a user-interface at a computer system that is network connectable to the chassis.

3. The method as recited in claim 1, wherein the act of receiving application instructions comprises an act of receiving application instructions for configuring a blade to implement a network diagnostic function.

4. The method as recited in claim 3, wherein the act of receiving application instructions for configuring a blade to implement a network diagnostic function comprises an act of receiving application instructions for configuring a blade to implement a network diagnostic function wherein the network diagnostic function is selected from among a jammer, an analyzer, a BERT, and a generator.

5. The method as recited in claim 1, wherein the act of receiving application instructions comprises an act of receiving XML instructions.

6. The method as recited in claim 1, wherein the act of referring to a component mapping to identify components that are to be configured to implement the received application instructions comprises an act of referring to a component mapping file to identify components that are to be configured to implement the received application instructions.

7. The method as recited in claim 1, wherein the act of referring to a component mapping to identify components that are to be configured to implement the received application instructions comprises an act of identifying the names of components that that are to be configured to implement the received application instructions.

8. The method as recited in claim 1, wherein the act of referring to a component mapping to identify components that are to be configured to implement the received application instructions comprises an act of referring to application to component mapping XML instructions.

9. The method as recited in claim 1, wherein the act of generating mapped application instructions in accordance with the referred to component mapping comprises an act of generating an application instruction for each component that is to be configured to implement the receive application instructions.

10. The method as recited in claim 1, wherein the act of referring to a component description language to identify corresponding compatible low-level instructions for configuring the identified components comprises an act of referring to a component description language file to identify values for accessing the identified components.

11. The method as recited in claim 1, wherein the act of referring to a component description language to identify corresponding compatible low-level instructions for configuring the identified components comprises an act of referring to a schema that constrains the meaning of mapped application instructions.

12. The method as recited in claim 1, wherein the act of referring to a component description language to identify corresponding compatible low-level instructions for configuring the identified components comprises an act of referring to component description XML instructions that define the meaning of the mapped application instructions.

13. The method as recited in claim 1, further comprising:
   an act of utilizing the component description language to generate the compatible low-level instructions.

14. The method as recited in claim 1, wherein the act of sending compatible low-level instructions to the identified components to configure the identified components to implement the received application instructions comprises an act of sending low-level instructions to a blade.

15. The method as recited in claim 1, wherein the act of sending compatible low-level instructions to the identified components to configure the identified components to implement the received application instructions comprises an act of sending low-level instructions to a programmable logic module.

16. The method as recited in claim 1, wherein the act of sending compatible low-level instructions to the identified components to configure the identified components to implement the received application instructions comprises an act of sending low-level instructions for changing the configuration of a network diagnostic function.

17. The method as recited in claim 16, wherein the act of sending low-level instructions for changing the configuration of a network diagnostic function comprises an act of sending low-level instructions for changing the configuration of a network diagnostic function wherein the network diagnostic function is selected from among a jammer, an analyzer, a BERT, and a generator.

18. A computer program product for use at a chassis, the computer program product for implementing a method for configuring components to implement a network diagnostic function, the computer program product comprising one or more computer-readable media having stored thereon computer-executable instructions that, when executed by a processor, cause the chassis to perform the following:

receive application instructions;

refer to a component mapping to identify components that are to be configured to implement the received application instructions;

generate mapped application instructions in accordance with the referred to component mapping;

refer to a component description language to identify corresponding compatible low-level instructions for configuring the identified components; and send the compatible low-level instructions to the identified components to configure the identified components to implement the received application instructions.

19. The computer program product as recited in claim 18, wherein computer-executable instructions that, when executed, cause the computer system to receive application instructions comprise computer-executable instructions that, when executed, cause the computer system to receive XML instructions.

20. The computer program product as recited in claim 18, wherein computer-executable instructions that, when executed, cause the computer system to receive application instructions comprise computer-executable instructions that, when executed, cause the computer system to receive application instructions for configuring a blade to implement a network diagnostic function.

21. The computer program product as recited in claim 20, wherein computer-executable instructions that, when executed, cause the computer system to receive application instructions for configuring a blade to implement a network diagnostic function comprise computer-executable instructions that, when executed, cause the computer system to receive application instructions for configuring a blade to implement a network diagnostic function wherein the network diagnostic function is selected from among a jammer, an analyzer, a BERT, and a generator.

22. The computer program product as recited in claim 18, wherein computer-executable instructions that, when executed, cause the computer system to refer to a component mapping to identify components that are to be configured to implement the received application instructions comprise computer-executable instructions that, when executed, cause the computer system to refer to a component mapping file to identify components that are to be configured to implement the received application instructions.

23. The computer program product as recited in claim 18, wherein computer-executable instructions that, when executed, cause the computer system to refer to a component mapping to identify components that are to be configured to implement the received application instructions comprise computer-executable instructions that, when executed, cause the computer system to identify the names of components that that are to be configured to implement the received application instructions.

24. The computer program product as recited in claim 18, wherein computer-executable instructions that, when executed, cause the computer system to refer to a component mapping to identify components that are to be configured to implement the received application instructions comprise computer-executable instructions that, when executed, cause the computer system to refer to application to component mapping XML instructions.

25. The computer program product as recited in claim 18, wherein computer-executable instructions that, when executed, cause the computer system to generate mapped application instructions in accordance with the referred to component mapping comprise computer-executable instructions that, when executed, cause the computer system to generate an application instruction for each component that is to be configured to implement the receive application instructions.

26. The computer program product as recited in claim 18, wherein computer-executable instructions that, when executed, cause the computer system to refer to a component description language to identify corresponding compatible low-level instructions for configuring the identified components comprise computer-executable instructions that, when executed, cause the computer system to refer to a component description language file to identify values for accessing the identified components.

27. The computer program product as recited in claim 18, wherein computer-executable instructions that, when executed, cause the computer system to refer to a component description language to identify corresponding compatible low-level instructions for configuring the identified components comprise computer-executable instructions that, when executed, cause the computer system to refer to a schema that constrains the meaning of mapped application instructions.

28. The computer program product as recited in claim 18, wherein computer-executable instructions that, when executed, cause the computer system to refer to a component description language to identify corresponding compatible low-level instructions for configuring the identified components comprise computer-executable instructions that, when executed, cause the computer system to refer to component description XML instructions that define the meaning of the mapped application instructions.

29. The computer program product as recited in claim 18, further comprising computer-executable instructions that, when executed, cause the computer system to utilize the component description language to generate the compatible low-level instructions.

30. The computer program product as recited in claim 18, wherein computer-executable instructions that, when executed, cause the computer system to send compatible low-level instructions to the identified components to configure the identified components to implement the received application instructions comprise computer-executable instructions that, when executed, cause the computer system to send low-level instructions to a blade.

31. The computer program product as recited in claim 18, wherein computer-executable instructions that, when executed, cause the computer system to send compatible low-level instructions to the identified components to configure the identified components to implement the received application instructions comprise computer-executable instructions that, when executed, cause the computer system to send low-level instructions to a programmable logic module.

32. The computer program product as recited in claim 18, wherein computer-executable instructions that, when executed, cause the computer system to send compatible low-level instructions to the identified components to configure the identified components to implement the received application instructions comprise computer-executable instructions that, when executed, cause the computer system to send low-level instructions for changing the configuration of a network diagnostic function.

33. The computer program product as recited in claim 32, wherein computer-executable instructions that, when executed, cause the computer system to send low-level instructions for changing the configuration of a network diagnostic function comprise computer-executable instructions that, when executed, cause the computer system to send low-level instructions for changing the configuration of a network diagnostic function wherein the network diagnostic function is selected from among a jammer, an analyzer, a BERT, and a generator.

* * * * *